A. MICHIE.
SAW BLADE HOLDER.
APPLICATION FILED MAY 29, 1914.
1,127,062.
Patented Feb. 2, 1915.
3 SHEETS—SHEET 1.
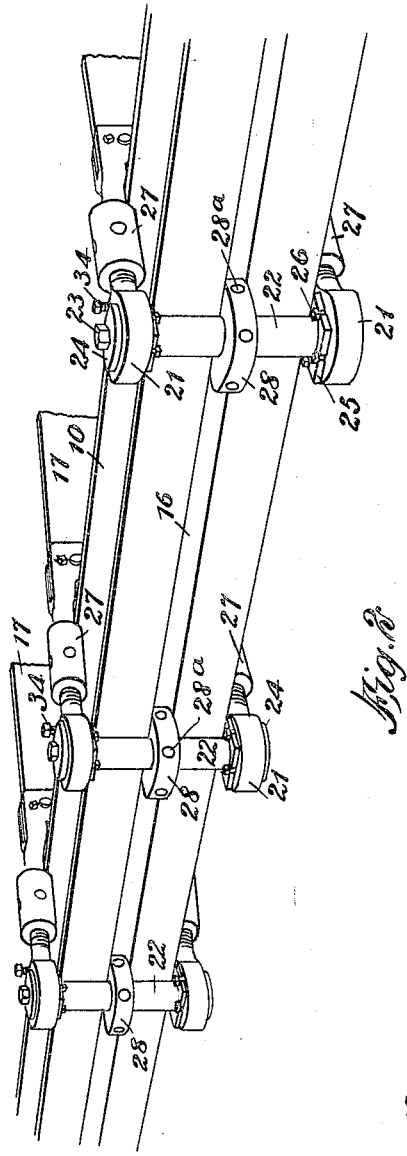
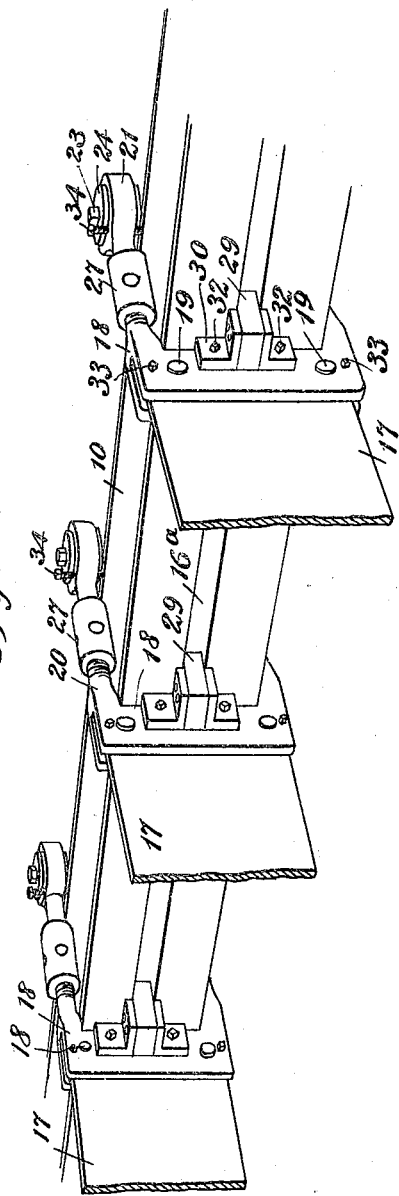
WITNESSES
INVENTOR
Arthur Michie
BY
ATTORNEYS
THE NORRIS PETERS CO., PHOTO-LITHO., WASHINGTON, D. C

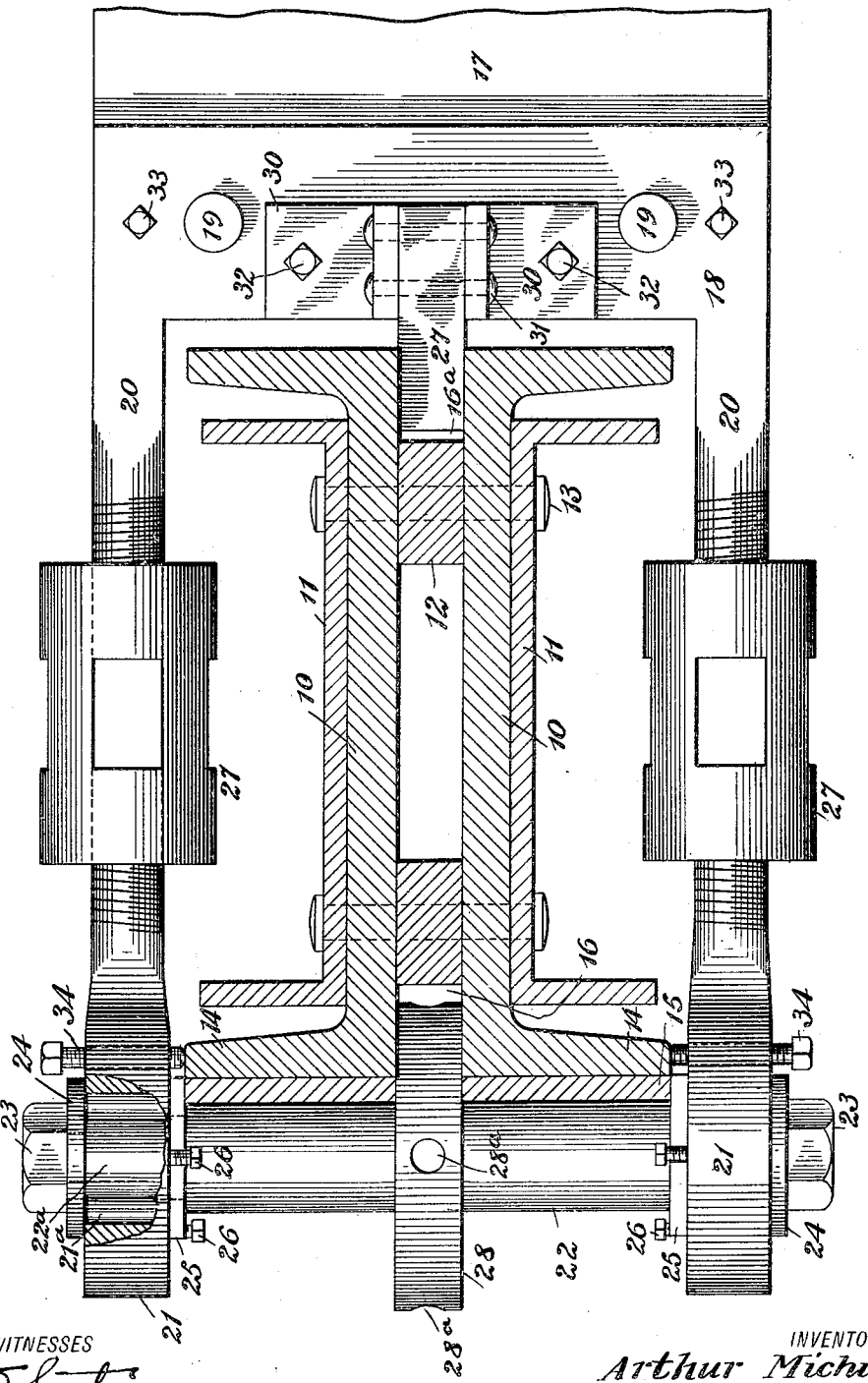

A. MICHIE.
SAW BLADE HOLDER.
APPLICATION FILED MAY 29, 1914.
1,127,062.
Patented Feb. 2, 1915.
3 SHEETS—SHEET 3.
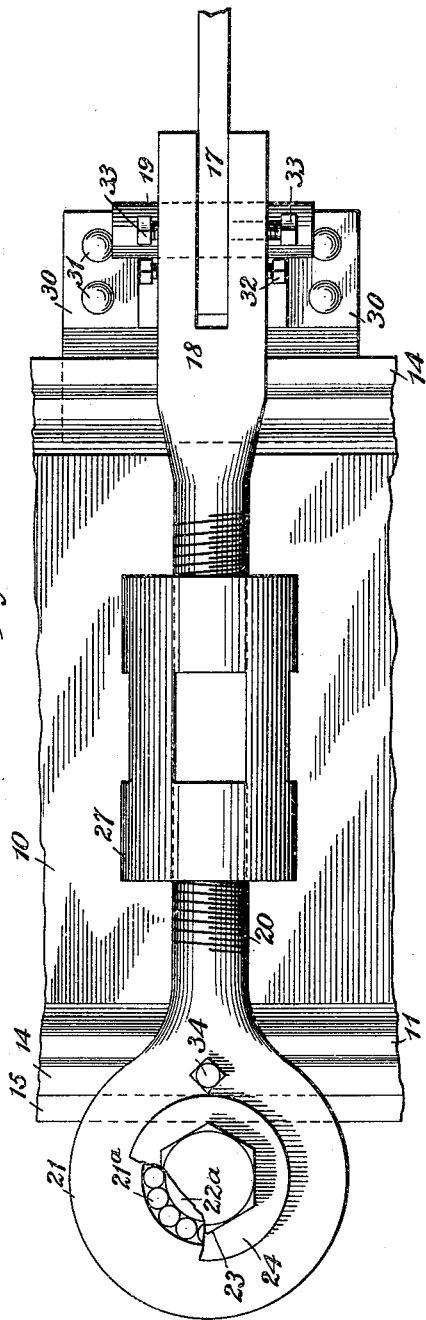
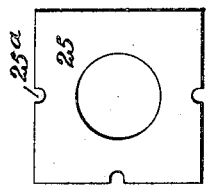
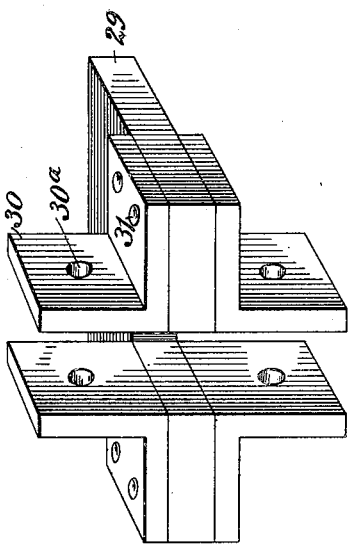
WITNESSES
INVENTOR
Arthur Michie
BY
ATTORNEYS

UNITED STATES PATENT OFFICE.

ARTHUR MICHIE, OF BEDFORD, INDIANA, ASSIGNOR TO SHEA & DONNELLY COMPANY INC., OF BEDFORD, INDIANA.

SAW-BLADE HOLDER.

1,127,062.  Specification of Letters Patent.  Patented Feb. 2, 1915.

Application filed May 29, 1914. Serial No. 841,841.

*To all whom it may concern:*

Be it known that I, ARTHUR MICHIE, a citizen of the United States, and a resident of Bedford, in the county of Lawrence and State of Indiana, have invented a new and Improved Saw-Blade Holder, of which the following is a full, clear, and exact description.

My invention relates to stone-sawing machines, and particularly to the means for holding the saw-blades on the saw-frame. With the form of blade holder ordinarily employed a disturbance of the tension of the blades is a necessary incident to the shifting of the blades in the frame.

Objects of my invention are to provide a saw-blade holder that will permit of the saw-blade being shifted in the saw frame without affecting the tension of the blade; to provide novel means for effectively tensioning the blade; as well as to make provision for the convenient shifting of the position of the blade, and for properly securing the blade in the adjusted position.

In carrying out my invention, use is made of blade holders for the opposite ends of the blade, the said holders having arms provided with turnbuckles for producing tension in the blades, means being provided whereby to readily move the holders along the saw frame independently of the tensioning means, and properly guide the holder in its movements. Set screws secure the holders in the adjusted position on the saw frame.

The invention will be particularly explained in the specific description following.

Reference is to be had to the accompanying drawings forming a part of this specification, in which similar characters of reference indicate corresponding parts in all the views.

Figure 1 is an outside perspective view showing a series of my improved blade holders, and a portion of the saw frame and blades; Fig. 2 is a similar view showing the inner ends of the holders; Fig. 3 is a side elevation of one of my improved blade holders, on an enlarged scale, a portion being broken away to show a bearing, a portion of the saw frame being shown in transverse vertical section; Fig. 4 is a fragmentary plan view of a blade holder on the saw frame. Fig. 5 is a perspective view of a guide associated with the blade holder; and Fig. 6 is a detail plan view of a washer to be hereinafter referred to.

In constructing a practical embodiment of my invention in accordance with the illustrated example, a saw frame, designated generally by the numeral 10, is supported and operated in the usual manner. The frame is made up of reversely placed channels, and may have U-bars 11 laid thereon. Between the main channel bars spacing elements 12 are inserted, and rivets 13 are employed to unite the several parts. The frame members 10 thus present vertical side flanges 14, the outer sides of which are faced by the facing plates 15, and the said plates and channel bars, by reason of the spacing elements 12, provide guideways 16, 16$^a$, respectively at the inner and outer sides of the frame.

In order to support the saw blades 17 on the frame 10, my improved holders are each formed with members to receive the ends of the saw-blades, said members being preferably in the form of heads 18 presenting cheeks spaced sufficiently to accommodate a saw-blade therebetween. Pins 19 extend transversely through the cheeks of the said heads to hold the blade.

Extending outwardly at the top and bottom of the heads 18 are arms 20, the one arm extending above the frame 10 and the other beneath the frame. At the outer ends the arms 20 are given the form of bearings 21, which preferably have bearing rollers 21$^a$ and receive vertical rollers 22 extending from the upper to the lower head 18. In the present example the rollers 22 are formed with reduced tenons 22$^a$, which are received within the bearing rollers 21$^a$, and the said rollers 22 are held in place in the bearings 21 by washers 24 and stud bolts 23, the said washers and stud bolts being above the upper bearing 21 and at the bottom of the lower bearing 21. At the inner faces of the bearings 21, washers or dust plates 25 are preferably provided, and are formed with edge recesses 25$^a$ for receiving set screws or stud bolts 26 which take into the adjacent faces of the bearings 21.

The arms 20 are provided with turnbuckles 27 for adjusting the tension of the saw blade 17. By turning the turnbuckles to tension the blade, the vertical rollers 22 will be brought firmly against the face plates 15 of the frame 10, so that the said rollers and face plates receive the strain of tensioning.

In order to shift the position of the saw-blade, I provide for giving a turning movement to the rollers 22 of the holders at opposite ends of the blade, so as to cause the said rollers to roll along the face plates 15. For the stated purpose, each roller 22 is formed with a collar 28 which extends into the guideway 16, at the outer side of the channels of the saw frame 10, and said collars are formed with suitable holes 28a for receiving a turning bar. It will be clear, that owing to the friction between the rollers 22 and the face plates 15, the turning of the rollers will cause the same to roll along the said face plates.

In order to further guide the blade holders in their movements along the saw frame, I provide in addition to the collars 28, guides 29 at the inner side of the frame, the said guides extending into the guideways 16a. As here shown the guides 29 are secured between brackets 30 on opposite sides of the forked heads 18, the brackets being arranged in pairs spaced to receive said guides 29, rivets or equivalent fastening means 31 being employed to secure the guides to the brackets. In order to secure the brackets 30 to the cheeks 18, set screws 32 are employed, the brackets being formed with holes 30a to receive said set screws, it being understood that the said set screws take into threaded holes in the cheeks of the heads 18.

To retain the blade holder in the given position on the saw frame 10, I provide set screws 34 in the respective arms 20 adjacent to the bearings 21, said set screws being positioned to engage the upper and lower edges of the flanges 14. Additional set screws 33 are provided in the cheeks of the heads 18, and bear against opposite faces of the blades to set up the said blades and maintain the same in the vertical plane. A proper adjustment of the various set screws will serve to dispose the saw-blades in proper position.

With the described construction it will be seen that the tensioning means 27 is independent of the means for shifting the position of the blade holder, so that the saw-blades may be positioned in the saw frame as desired, without any disturbance of the tension. In order to shift the position of a blade it is necessary only to loosen the set screws 34 and turn the rollers 22 at the opposite ends of the blade, through the medium of the collars 28, the said collars and the guides 29 serving to give the proper guided movement to the holders on the saw frame.

The described construction affords a practical means for carrying my invention into effect, and I would state in conclusion that I do not limit myself strictly to the mechanical details herein illustrated, since manifestly the same can be considerably varied without departure from the spirit of the invention.

Having thus described my invention, I claim as new and desire to secure by Letters Patent:

1. A holder for the blades of stone saws, comprising members adapted to slidably engage the side of a saw frame, means on the inner end of the holder to engage a saw, tensioning means adapted to move said first mentioned means in a direction to tension the saw-blade, a roller on the holder at the outer end adapted to bear against the outer side face of the saw frame, and means whereby to turn said roller and cause the same to roll on the frame to shift the holder.

2. A holder for the blades of stone saws, comprising members adapted to slidably engage the side of a saw frame, means on the holder at the inner end to attach an end of a saw blade, a vertical roller on the holder at the outer end, means whereby to cause the roller to have frictional contact with the outer side of the saw frame, and means whereby to turn said roller and thereby shift the holder longitudinally on the frame.

3. A holder for the blades of stone saws, comprising vertically spaced members adapted to slidably receive the side of a saw frame, a blade-holding head at the inner end of the holder, a guide on said head additional to said members and projecting toward the outer end of the holder to engage the inner side of a saw frame, an element on the holder at the outer end adapted to bear against the outer face of the saw frame, a guide member on said element to engage the saw frame between the vertically spaced members, and a variable connection between the inner and outer ends of the holder to tension the saw-blade by reducing the distance between the blade-holding head and the said element at the outer end.

4. A holder for the blades of stone saws, comprising upper and lower arms spaced vertically to accommodate the side of a saw frame, a blade-holding head connecting the inner ends of the arms, a vertical roller journaled in the outer ends of the arms, and turnbuckles in said arms to tension the blades and press the roller into frictional engagement with the saw frame, the said roller having a collar formed with means to receive a turning device.

5. A holder for the blades of stone saws, comprising upper and lower arms spaced vertically to accommodate the side of a saw frame, a blade having a blade-holding head connecting the inner ends of the arms, a vertical roller journaled in the outer ends of the arms, guides on the roller and blade-holding head, the guides being disposed toward each other and adapted for guided engagement with the side of a saw frame, and turnbuckles in said arms.

6. A holder for the blades of stone saws, comprising upper and lower spaced arms, a head connected with the arms at the inner end and formed with cheeks to receive the saw blade, means on the head to detachably engage a saw-blade, set screws taking laterally into said cheeks to adjust the position of the blade, turnbuckles in the arms, and a roller journaled in the outer ends of the arms and provided with means whereby it may be turned.

7. A holder for the blades of stone saws, comprising upper and lower spaced arms, a head connected with the arms at the inner end and formed with cheeks to receive the saw blade, means on the head to detachably engage a saw-blade, set screws taking laterally into said cheeks to adjust the position of the blade, turnbuckles in the arms, a roller journaled in the outer ends of the arms and provided with means whereby it may be turned, and set screws on the arms, near the outer ends thereof, outside of the turnbuckles, to secure the holder against longitudinal movement.

8. A holder for the blades of stone saws, comprising upper and lower arms spaced to accommodate the side of a saw frame, means on the arms at the inner end to hold a saw-blade, a vertical roller at the outer ends of the arms, bearings on the arms for the roller, means on the roller at the ends to hold the same in the arms, washers on the roller at the inner sides of the bearings, set screws engaging the washers and bearings, and means on the roller whereby it may be turned.

In testimony whereof I have signed my name to this specification, in the presence of two subscribing witnesses.

ARTHUR MICHIE.

Witnesses:
CONSTANCE M. SHAUNER,
BESS NEWKIRK.

Copies of this patent may be obtained for five cents each, by addressing the "Commissioner of Patents, Washington, D. C."